United States Patent
Bhagavathula et al.

(10) Patent No.: US 11,604,501 B2
(45) Date of Patent: Mar. 14, 2023

(54) METHOD AND SYSTEM FOR TEMPERATURE-AWARE POWER REDISTRIBUTION IN A MULTI-PORT POWER SOURCING DEVICE

(71) Applicant: SILICONCH SYSTEMS PVT LTD, Karnataka (IN)

(72) Inventors: Siva Naga Subrahmanya Saratchandra Bhagavathula, Telangana (IN); Munnangi Sirisha, Andhra Pradesh (IN); Kaustubh Kumar, Uttar Pradesh (IN); Rakesh Kumar Polasa, Karnataka (IN)

(73) Assignee: Siliconch Systems Pvt Ltd, Karnataka (IN)

( * ) Notice: Subject to any disclaimer, the term of this patent is extended or adjusted under 35 U.S.C. 154(b) by 44 days.

(21) Appl. No.: 17/338,644

(22) Filed: Jun. 3, 2021

(65) Prior Publication Data
US 2022/0113776 A1 Apr. 14, 2022

(30) Foreign Application Priority Data
Oct. 9, 2020 (IN) .............................. 202041044098

(51) Int. Cl.
*G06F 1/26* (2006.01)
*G06F 1/18* (2006.01)
(Continued)

(52) U.S. Cl.
CPC .............. *G06F 1/266* (2013.01); *G06F 1/189* (2013.01); *G06F 1/206* (2013.01); *G06F 13/385* (2013.01); *G06F 2213/0042* (2013.01)

(58) Field of Classification Search
CPC .......... G06F 1/266; G06F 1/189; G06F 1/206; G06F 13/385; G06F 2213/0042;
(Continued)

(56) References Cited

U.S. PATENT DOCUMENTS

| | | | |
|---|---|---|---|
| 2007/0174527 A1* | 7/2007 | Vorenkamp | H04L 25/02 324/123 R |
| 2008/0178019 A1* | 7/2008 | McGrane | G06F 1/26 713/320 |

(Continued)

OTHER PUBLICATIONS

Universal Serial Bus Type-C Cable and Connector Specification Release 2.0, USB 3.0 Promoter Group, Aug. 2019 (373 pages).
(Continued)

*Primary Examiner* — Faisal M Zaman
(74) *Attorney, Agent, or Firm* — Procopio, Cory, Hargreaves & Savitch LLP

(57) ABSTRACT

The present disclosure relates to a method and system to facilitate temperature-aware redistribution of power in a power sourcing device comprising plurality of ports. The method can include monitoring, by using one or more sensors coupled to the power sourcing device, a first temperature associated with a first port of the plurality of ports to obtain a first set of signals and executing, at the power sourcing device, based on a second set of signals obtained from the first set of signals, a first set of instructions associated with redistribution of power from the first port to second port of the plurality of ports, wherein the second set of signals can indicate exceeding of the first temperature above the predefined threshold temperature value.

22 Claims, 7 Drawing Sheets

(51) Int. Cl.
*G06F 1/20* (2006.01)
*G06F 13/38* (2006.01)

(58) Field of Classification Search
CPC ..... G06F 1/26; G06F 1/16; G06F 1/20; G06F 1/28; G06F 1/3215; G06F 1/3296; G06F 2200/201; Y02D 10/00; H04L 12/10; G01K 13/00
See application file for complete search history.

(56) References Cited

U.S. PATENT DOCUMENTS

| | | | | |
|---|---|---|---|---|
| 2008/0238634 | A1* | 10/2008 | Diab | H04L 12/10 340/538 |
| 2009/0027033 | A1* | 1/2009 | Diab | G01K 13/00 323/318 |
| 2009/0100275 | A1* | 4/2009 | Chang | H02J 7/00 713/300 |
| 2011/0273917 | A1* | 11/2011 | Maitra | H02S 40/32 363/74 |
| 2012/0203393 | A1* | 8/2012 | Dumitru | G06F 1/206 361/679.02 |
| 2013/0307489 | A1* | 11/2013 | Kusch | B60L 58/26 320/167 |
| 2014/0331069 | A1* | 11/2014 | Branover | G06F 1/3234 713/340 |
| 2015/0160674 | A1* | 6/2015 | Burdette | G06F 13/385 700/295 |
| 2018/0232021 | A1* | 8/2018 | Perchlik | G06F 1/203 |
| 2019/0089023 | A1* | 3/2019 | Sastry | H01M 4/131 |
| 2019/0171267 | A1* | 6/2019 | Piwonka | G06F 13/38 |
| 2019/0339754 | A1* | 11/2019 | Armes | G05B 19/042 |
| 2020/0393885 | A1* | 12/2020 | Ghosh | G06F 1/3296 |
| 2021/0208654 | A1* | 7/2021 | Bhattacharjee | H02J 1/106 |
| 2022/0147129 | A1* | 5/2022 | Cheng | G06F 1/3206 |

OTHER PUBLICATIONS

Universal Serial Bus Power Delivery Specification, Revision 3.0, Version 2.0, Aug. 29, 2019 (657 pages).

* cited by examiner

METHOD AND SYSTEM FOR TEMPERATURE-AWARE POWER REDISTRIBUTION IN A MULTI-PORT POWER SOURCING DEVICE

CROSS-REFERENCE TO RELATED APPLICATIONS

This application claims priority to India Patent Application No. 2020-41044098, filed Oct. 9, 2020, the contents of which are incorporated herein by reference in its entirety for all purposes.

BACKGROUND

Technical Field

The present disclosure relates to a method and a system for power management of power sourcing devices, and more particularly, to method and system for temperature aware power redistribution in a multi-port power sourcing device.

Related Art

In conventional power sourcing devices, there may be a significant amount of power that may be allocated to ports as per requirement leading to heating of ports, connectors and cables. Further, the increase in the power requirement in all power sourcing devices demands a huge challenge in dissipating heat and preventing failures due to overheating of ports. To manage overheated components, cooling is used conventionally which is definitely expensive and also may lead to increase in the size requirement that would lead to a huge trade-off both in terms of size and functionality. Therefore, conventional systems/methods do not guarantee performance efficiency of the system due to oversight of excess power supply and also lead to high vulnerability to damage due to overheating problems.

Hence, there is a requirement in the art to devise a method or system which, can be power-efficient as well as enable thermal management in power sourcing devices.

SUMMARY

Some of the objects of the present disclosure, which at least one embodiment herein satisfies are as listed herein below.

An object of the present disclosure is to provide a method and system for power redistribution between ports in a multi-port power sourcing device.

An object of the present disclosure is to a method and system for power redistribution between ports in a multi-port power sourcing device based on temperature sensing.

An object of the present disclosure is to provide a thermal throttling to over-powered components.

An object of the present disclosure is to provide a method and system that can accurately monitor and control parameters for temperature-aware power redistribution between ports of a power sourcing devices.

The present disclosure relates to a method and system to facilitate temperature-aware redistribution of power in a power sourcing device having a plurality of ports. In an aspect, the method can include monitoring, by using one or more sensors coupled to the power sourcing device, a first temperature associated with a first port of the plurality of ports, wherein the monitoring can include sensing the first temperature associated with the first port and comparing the sensed first temperature with a predefined threshold temperature value to obtain a first set of signals, wherein the first port is associated with a first allocated power and; executing, at the power sourcing device, based on a second set of signals obtained from the first set of signals, a first set of instructions associated with redistribution of power from the first port to a second port of the plurality of ports, wherein the second set of signals can indicate exceeding of the first temperature above the predefined threshold temperature value. In an embodiment, the redistribution of power can be done by changing at least one attribute related to power delivery that leads to reduction in the first allocated power of the first port and increase in a second allocated power of the second port that may have a requirement for allocation of higher power, for facilitating temperature-aware redistribution of power in the power sourcing device.

In an aspect, the system can include a power sourcing device including a plurality of ports, plurality of sinks that may be connected to the plurality of ports and one or more sensors coupled with the power sourcing device. In an embodiment, each of the plurality of ports may be associated with an allocated power. The one or more sensors may be temperature sensors that may be placed on a position selected from any or a combination of a position in proximity to the plurality of ports, a position located internally on-die and a position located externally on printed circuit board (PCB) of the power sourcing device. The one or more sensors may be configured to: monitor a first temperature associated with a first port of the plurality of ports, wherein the monitoring may include sensing the first temperature associated with the first port and comparing the sensed first temperature with a predefined threshold temperature value to obtain a first set of signals, wherein the first port may be associated with a first allocated power. The power sourcing device may be configured to: execute, based on a second set of signals obtained from the first set of signals, a first set of instructions associated with redistribution of power from the first port to a second port of the plurality of ports, wherein the second set of signals may indicate exceeding of the first temperature above the predefined threshold temperature value. The redistribution of power may be done by changing at least one attribute related to power delivery that leads to reduction in the first allocated power of the first port and increase in a second allocated power of the second port having a requirement for allocation of higher power for facilitating temperature-aware redistribution of power in the power sourcing device.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein.

DETAILED DESCRIPTION

In the following description, numerous specific details are set forth in order to provide a thorough understanding of embodiments of the present invention. It will be apparent to one skilled in the art that embodiments of the present invention may be practiced without some of these specific details.

The present disclosure relates to a method and system to facilitate temperature-aware redistribution of power in a power sourcing device comprising plurality of ports by controlling the power being delivered to the plurality of ports of the device based on the temperature sensed over the ports, such that the power redistribution can be achieved by withdrawing/reducing power from the port that may be sensed to be overheated or display temperature beyond a certain predefined value and distributing/allocating the reduced power to other needy ports in the power sourcing device which may be thermally stable. The present disclosure thus provides a very effective and energy-efficient alternative that not only enables redistribution of power between ports but also leads to thermal throttling of ports that may be sensed to be overheated.

Figure 1A:
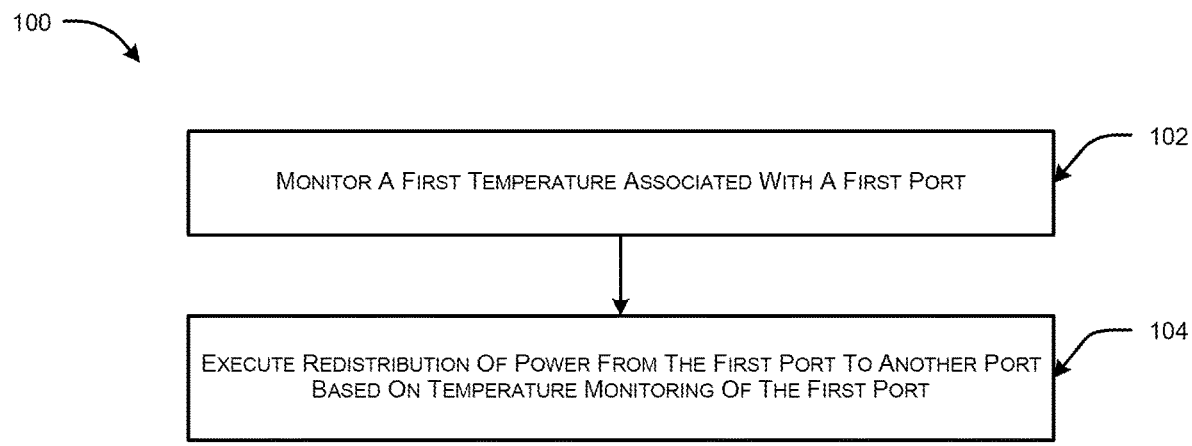
FIG. 1A is a flow diagram illustrating steps of a method (100) for redistribution of power in a power sourcing device having a plurality of ports, in accordance with an embodiment of the present disclosure.

FIG. 1A is a flow diagram illustrating steps of a method (100) for redistribution of power in a power sourcing device comprising plurality of ports, in accordance with an embodiment of the present disclosure. At 102, the method includes monitoring, by using one or more sensors coupled to the power sourcing device, a first temperature associated with a first port of the plurality of ports, wherein the monitoring may include sensing the first temperature associated with the first port and comparing the sensed first temperature with a predefined threshold temperature value to obtain a first set of signals. In an embodiment, the first port may be associated with a first allocated power. At 104, the method includes executing, at the power sourcing device, based on a second set of signals obtained from the first set of signals, a first set of instructions associated with redistribution of power from the first port to a second port of the plurality of ports, wherein the second set of signals may indicate exceeding of the first temperature above the predefined threshold temperature value.

In an embodiment, the redistribution of power can be done by changing at least one attribute related to power delivery that leads to reduction in the first allocated power of the first port and increase in a second allocated power of the second port having a requirement for allocation of higher power for facilitating temperature-aware redistribution of power in the power sourcing device. In an embodiment, the power sourcing device can be a multi-port power sourcing device, wherein each of the plurality of ports may be selected from Universal Serial Bus (USB) Type-C port and USB Type-A port. In an exemplary embodiment, each of the plurality of ports may be associated with an allocated power.

In an embodiment, the one or more sensors may be temperature sensors placed on a position selected from any or a combination of a position in proximity to the plurality of ports, a position located internally on-die and a position located externally on printed circuit board (PCB) of the power sourcing device. In an embodiment, in addition to sensing of the temperature of the first port, any or a combination of other parameters such as the overall temperature of the sink and temperature of cable connected to the first port and used for power delivery may also be considered. In an embodiment, the generation of the second set of signals may be based on temperature of the first port and other factors selected from any or a combination of temperature of remaining ports of the plurality of ports, position of the one or more sensors with respect to the power sourcing device, temperature of the sink and temperature of cable connected to the first port and used for power delivery.

In an embodiment, power may be allocated to the second port of the plurality of ports based on excess power supply to the first port, wherein the second port may a thermally stable port. In an embodiment, the second allocated power associated with the second port may be relatively lesser than power required by a sink connected to the second port. In an exemplary embodiment, the predefined value may be a threshold power supply value allocated to port in a normal operating condition, such that if allocation is made beyond the predefined value, the port may involve over-supply of power that may lead to over-heating.

In an embodiment, at least one attribute includes current flowing from each port to a port partner. As an example, in a power sourcing device that supports USB Power Delivery, the current drawn by sink over VBUS may be one of the major contributors for the rise in temperature of the overall system of the ports such as USB Type-C/A. Hence, reducing the current limit may reduce the temperature of the port that is overheated (e.g., beyond the threshold temperature). In an exemplary embodiment, the regulation of the at least one attribute may be done in a stepwise manner to reduce temperature of the port below the predefined threshold temperature.

The predefined threshold temperature value may include any limit selected from a warning threshold temperature value and/or a critical threshold temperature value. The critical threshold temperature value may be relatively higher than the warning threshold temperature value. In an exemplary embodiment, the monitoring and the signal generation may be such that upon detection of the first temperature of the first port exceeding the warning threshold temperature value, third set of signals may be generated and upon detection of the first temperature of the first port exceeding the critical threshold temperature value, a fourth set of signals may be generated, such that the third set of signals and the fourth set of signals may be sub-sets of the second set of signals. The selection of two such threshold values can ensure that power allocated to the first port may be effectively reduced upon detection of the third set of signals indicating temperature beyond the warning threshold temperature value, whereas upon receiving the fourth set of signals i.e temperature exceeding beyond the critical threshold temperature value, the port may be completely latched off to enable damage control. The warning threshold temperature value and the critical threshold temperature value may be preset in the system such that the monitoring can be done accordingly and the redistribution as well as the thermal management be effectively performed.

In an embodiment, the redistribution of power may lead to thermal throttling of first port i.e. the redistribution of power from the first port may lead to reduction in the first temperature such that the first temperature of the port may fall below the predefined threshold temperature value. In an embodiment, the redistribution of power may be achieved by reduction of current limit from the first port to a port partner.

The redistribution of power may include reducing the current limit from the first port and increasing the current limit from second port of the plurality of ports. This can enable effective management of supply of power while avoiding the damage to ports by performing thermal throttling. In an embodiment, in the case of USB Power Delivery, the redistribution of power may be achieved by communication between the plurality of ports and the sinks connected thereto by a request-response communication in form of data packets. The power that can be supplied by the ports can be fixed or variable in nature and power capabilities of the port can be communicated by data packets that can include a Source_Capabilities Message such that power negotiation can occur between the ports and the sinks connected to them. The Source_Capabilities Message can include one or more Power Data Object (PDO) that can carry the information regarding the variable or fixed power supply. As per the protocol, after receiving the Source_Capabilities Message, the sink can send a Request Message to place a request power, The Request Message can be in form of data packets including PDO with specific information related to the particular power specification being requested (e.g., represented by an index value), wherein each index value can correspond to the particular specification of power being requested. After receiving the request from sink, the request may be accepted with an Accept Message to change the power supply to the new power level as requested.

In an aspect, upon detection of the second set of signals, the current limit corresponding to the first allocated power and the second allocated power may be updated and communicated by the request-response communication, wherein the first allocated power is associated with the first port and the second allocated power is associated with the second port. In an embodiment, upon detection of the second set of signals that indicate the first temperature exceeding the critical threshold temperature value, in case of USB Power Delivery, the current limit corresponding to 0 A may be advertised in all the source capabilities (included in form of data packets). In an exemplary embodiment, in case of USB Power Delivery capable sink, power allocated to the ports that may be sensed to be at higher temperature may be redistributed by throttling such that when temperature of a port crosses the critical threshold temperature value, the current limit that may be advertised in different PDOs of the SourceCapabilities message may be updated to 0 A and the updated SourceCapabilities message may be sent to the sink, hence enabling a faster recovery when the temperature returns to normal range as the USB-PD contract is maintained. In an aspect, upon detection of the second set of signals that indicate the first temperature exceeding the critical threshold temperature value, the first port may be shut down and the sink may be latched off from VBUS power with an intention to reduce the temperature with a rapid rate.

In an exemplary embodiment, if the power sourcing device supports USB power delivery (USB-PD), the reduction in the current limit can be obtained by sending, from a port to a sink, a first set of data packets including updated information associated with current capabilities for renegotiation, wherein the first set of data packets can include Power Data Object (PDO) of a modified SourceCapabilities message obtained by updating current capabilities advertised in an original SourceCapabilities message, and wherein the update in the current capabilities can include reduction in the current limit by a predetermined percentage. In an embodiment, before sending the first set of data packets, the method can include sending, from the USB Type-C port to the sink, a second set of data packets can include an alert message with Over-temperature protection (OTP) bit information set as 1, to inform detection of over-heating caused by exceeding of the port temperature over any of the warning threshold temperature value and the critical threshold temperature value. In an embodiment, after the alert message may be sent to the sink, a configurable time duration may be given to the sink for reducing power requirement by sending, from the sink to the port, a third set of data packets including an updated request message with information about the reduced operating current requirement. Upon receipt of the updated request message, the request may be accepted by the port by sending an accept message in form of fourth set of data packets, wherein an internal update to the first set of data packets including SourceCapabilities message PDO may be performed by reducing limit of the current limit of the negotiated PDO to the reduced Operating Current requested by sink.

In an exemplary embodiment, a method for facilitating power redistribution over USB Type-C/Type-A ports of a multi-port power sourcing device may be explained, wherein each port may be of USB Type-C or USB Type-A. The power distribution across each port of the number of ports may be controlled by a coordinated pair of a master control mechanism and a slave handler mechanism. The master control mechanism may maintain a record of the allocated power across various ports and available power, and may control the slave handler mechanism via a request-response communication interface. In this case, the slave handler mechanism may deliver power based on active power negotiation protocol out of the supported protocols and based on the control requests from the master control mechanism. In an embodiment, in case of USB Type-C, the slave handler mechanism may attempt to discover sink support of USB Power Delivery (USB-PD) protocol, by sending a first data packet (e.g., SourceCapabilities) message on a configuration channel (CC) line and may await time-bounded detection of the second data packet acknowledgement from the sink across a set number of retry attempts. Also, the slave handler mechanism may use SourceCapabilities or otherwise to advertise power profiles which may be custom-configured to any supply type and supply voltages. In any case, the current limits advertised corresponding to each power profile may be chosen to adhere to the power allocated to the port by the master control mechanism depending on the temperature sensing as described in the previous embodiments.

Figure 1B:
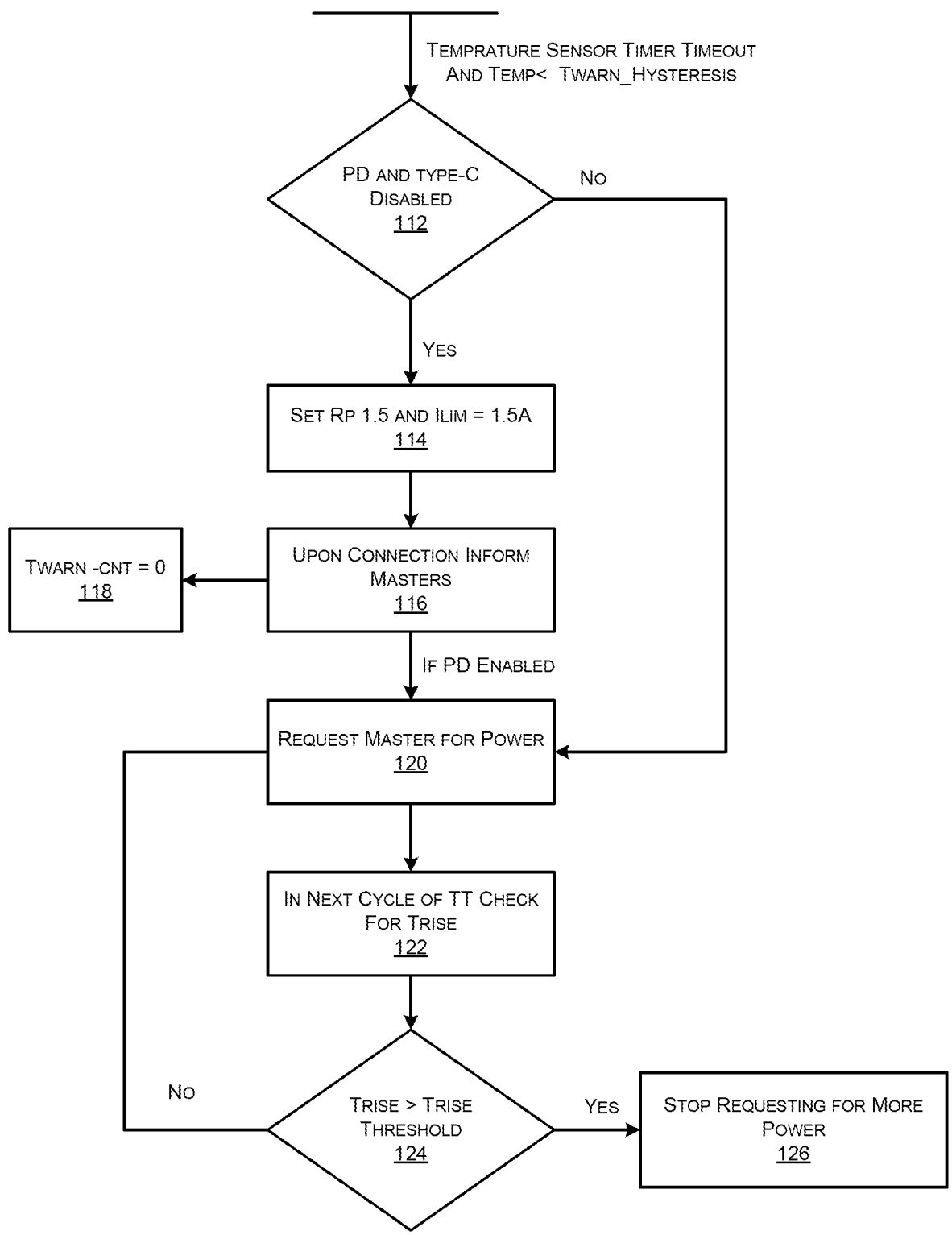
FIG. 1B illustrates an exemplary flow diagram representation of a first set of instructions for monitoring temperature

FIG. 1B illustrates an exemplary flow diagram representation of a first set of instructions for monitoring temperature and redistribution of power, in accordance with an embodiment of the present disclosure. In an embodiment, with respect to FIG. 1B, upon determining that temperature (TEMP) is less than the warning hysteresis temperature ($T_{WARN\_HYSTERESIS}$), at block 112, PD and Type-C is disabled. Upon determining that the PD and Type_C is disabled, at block 114, RP is set to 1.5 and $I_{LIM}$=1.5 A and a connection is established. At block 116, upon connection inform master and at block 118, the difference between $T_{WARN}$ and $C_{NT}$ is zero ($T_{WARN}-C_{NT}=0$). If at block 116, upon connection inform master and enable PD. If PD is enabled, at block 120, request master for power and at block 122, in next cycle of thermal throttling check for temperature rise ($T_{RISE}$). At block 124, if $T_{RISE}$ is greater than threshold temperature rise ($T_{RISE}$ THRESHOLD) (YES), then stop requesting for more power at block 126. At block 124, if $T_{RISE}$ is less than $T_{RISE}$ THRESHOLD (NO), then request master for power at block 120. At block 112, if PD and TYPE-C is not disabled, then at block 120, request master for power.

In an embodiment, wherein upon reduction in power delivery, a power management system associated with the power sourcing device may enable withdrawal of the power into a reserved pool from the port that is subjected to thermal throttling, wherein the withdrawn power may be allocated to another port based on the requirement. In an embodiment, the generation of the second set of signals may be based on any or a combination of factors selected from temperature of first port in comparison to the predefined threshold temperature value, temperature of the second port of the plurality of ports and position of the one or more sensors with respect to the power sourcing device. Thus, the rise in temperature at the port may be evaluated based on its own thermal sense data and correlated with the thermal sense data of other ports or connectors.

In an embodiment, if a close proximity of the port temperature to the first threshold temperature may be sensed, the port temperature sensed on the port can be correlated/checked against the current being drawn on this port using a Current-to-Temperature Estimation model (CTE model) of the device, which takes the current being drawn and the temperature sensed as input. In an exemplary embodiment, if a close proximity of the port temperature to the first threshold temperature may be sensed, the first temperature sensed on the first port may be correlated against the current being drawn on this port using the CTE model. In an exemplary embodiment, if the CTE model returns a negative correlation between the temperature rise against the current being drawn on the first port, then the current drawn over the other ports may be correlated/checked against the rise in the port temperature. In another exemplary embodiment, if any other port (other than the port detected to exceed first threshold temperature i.e. other than first port) establishes a positive correlation as per the CTE model, the power on the port initially detected to be close to exceeding the first threshold temperature (first port) may not be thermally throttled and power delivery to the first port may not be reduced. In another exemplary embodiment, if no port establishes a positive correlation as per the CTE model, an external/unknown source of thermal rise may be assumed, and all ports may be thermally throttled in a balanced manner. Hence, dependency of other ports may also be considered while throttling the power delivered to a port to avoid a false thermal throttling of the port.

Figure 2:
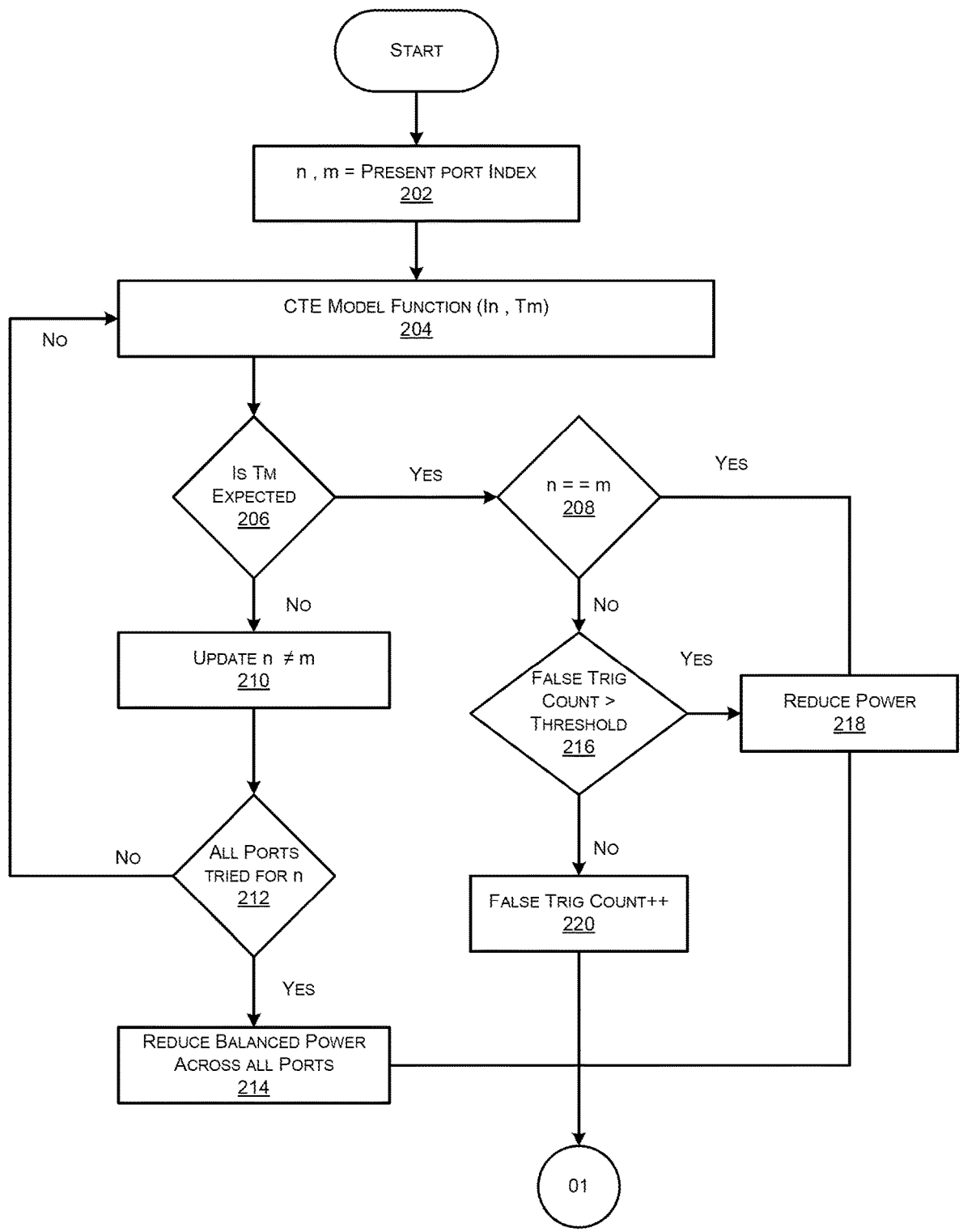
FIG. 2 illustrates an exemplary flow diagram representation of a set of instructions for identifying ports that may be overheated using a CTE model function to avoid false thermal throttling of the port, in accordance with an embodiment of the present disclosure.

In accordance with the above discussed embodiment, FIG. 2 illustrates an exemplary flow diagram representation of a set of instructions for identifying ports that may be overheated using the proposed CTE model function to avoid false thermal throttling of the port and to prevent reduction of power supply from the port, in accordance with an embodiment of the present disclosure. As shown in FIG. 2, at 202, a port may be checked to verify correlation between the port temperature sensed on the port against the current being drawn on the particular port using the Current-to-Temperature Estimation model (CTE model) (204) of the device, wherein n indicates a port that may represent positive correlation (or requiring thermal throttling) whereas m indicates present port index.

At 206, the port m may be checked for a positive correlation between temperature and current drawn. If n=m as shown in 208 indicates YES, it means a positive correlation is established and thermal throttling may be performed by reduction of power (218). However, if n=m as shown in 208 indicates NO, it means a negative correlation is established and at 216, the count of false trigger is checked if it is beyond a predefined threshold. If YES, then power reduction and so the thermal throttling is done. If no, then the count of false trigger count may be recorded (220) and the process can be directed to sub-routine (01) (elaborated in FIG. 3). In case, if at 206, the current of m port does not indicate a positive correlation then the other ports are checked (212) using the same steps as discussed above (starting from 204). In case if no port establishes a positive correlation as per the CTE model, an external/unknown source of thermal rise may be assumed, and all ports may be thermally throttled in a balanced manner as shown in 214. In an embodiment, and as a precaution to avoid any attempts of power upgrade from the power sourcing device to the sink when the thermal throttling may be performed over the USB Power Delivery, the power sourcing device may be set to ignore CapabilityMismatch bit in Request message from the sink.

Figure 3:
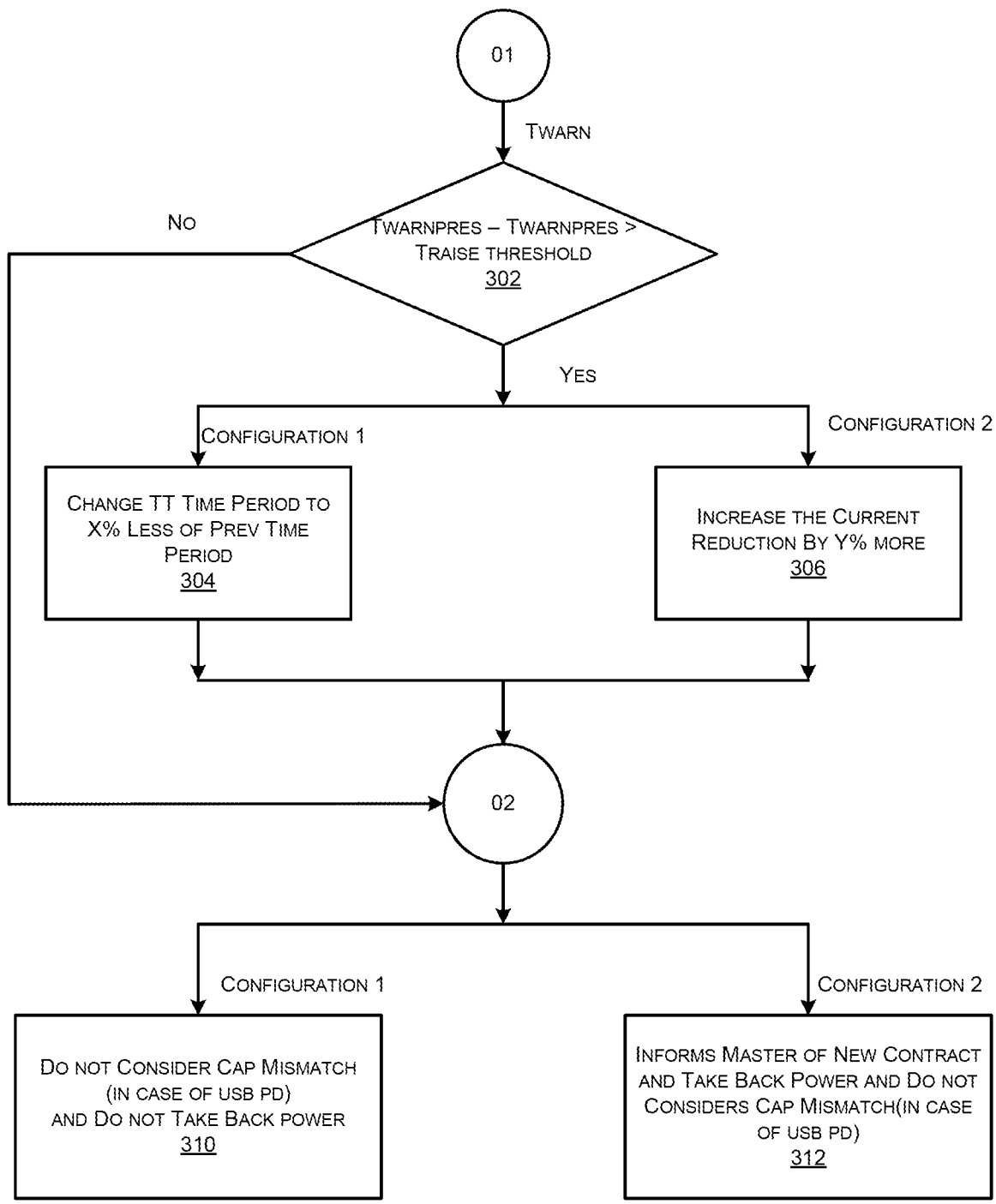
FIG. 3 illustrates an exemplary flow diagram representation of a set of instructions for power redistribution between ports in a stepwise manner with different types of configurations, in accordance with an embodiment of the present disclosure.

In accordance with the above discussed embodiment, FIG. 3 illustrates an exemplary flow diagram representation of a set of instructions for power redistribution between ports in a stepwise manner with different type of configurations, in accordance with an embodiment of the present disclosure. As shown in sub-routine 01, at 302, upon detection of the port temperature beyond first threshold temperature i.e. $T_{WARNPRES}-T_{WARNPREV} > T_{RISE\ THRESHOLD}$, either of one configuration (304 or 306) may be adapted wherein 304 may be related to time of thermal throttling and 306 may be related to the current limit. If 304 is chosen, the thermal throttling time period may be changed to x % less than previous set time period. If 306 is chosen, the current limit may be reduced to y % more than its previous value. Using any of the configurations, the power delivery may be reduced (entry to sub-routine 02). In response to the reduction in power delivery (in case of USB PD), any of the configurations as shown in 310 and 312 may be adapted. In 310, the power sourcing device may be set to ignore CapabilityMismatch bit in Request message from the sink and the power may not be taken back, otherwise configuration shown in 312 may be adapted.

In an embodiment, if the power sourcing device comprises the USB power delivery (USB-PD), before sending the first set of data packets, the method can include sending, from the USB Type-C port to the sink, a second set of data packets including an alert message with Over-temperature protection (OTP) bit information set as 1, to inform detection of over-heating caused by exceeding of the port temperature over any of the warning threshold temperature value or the critical threshold temperature value.

Figure 4:
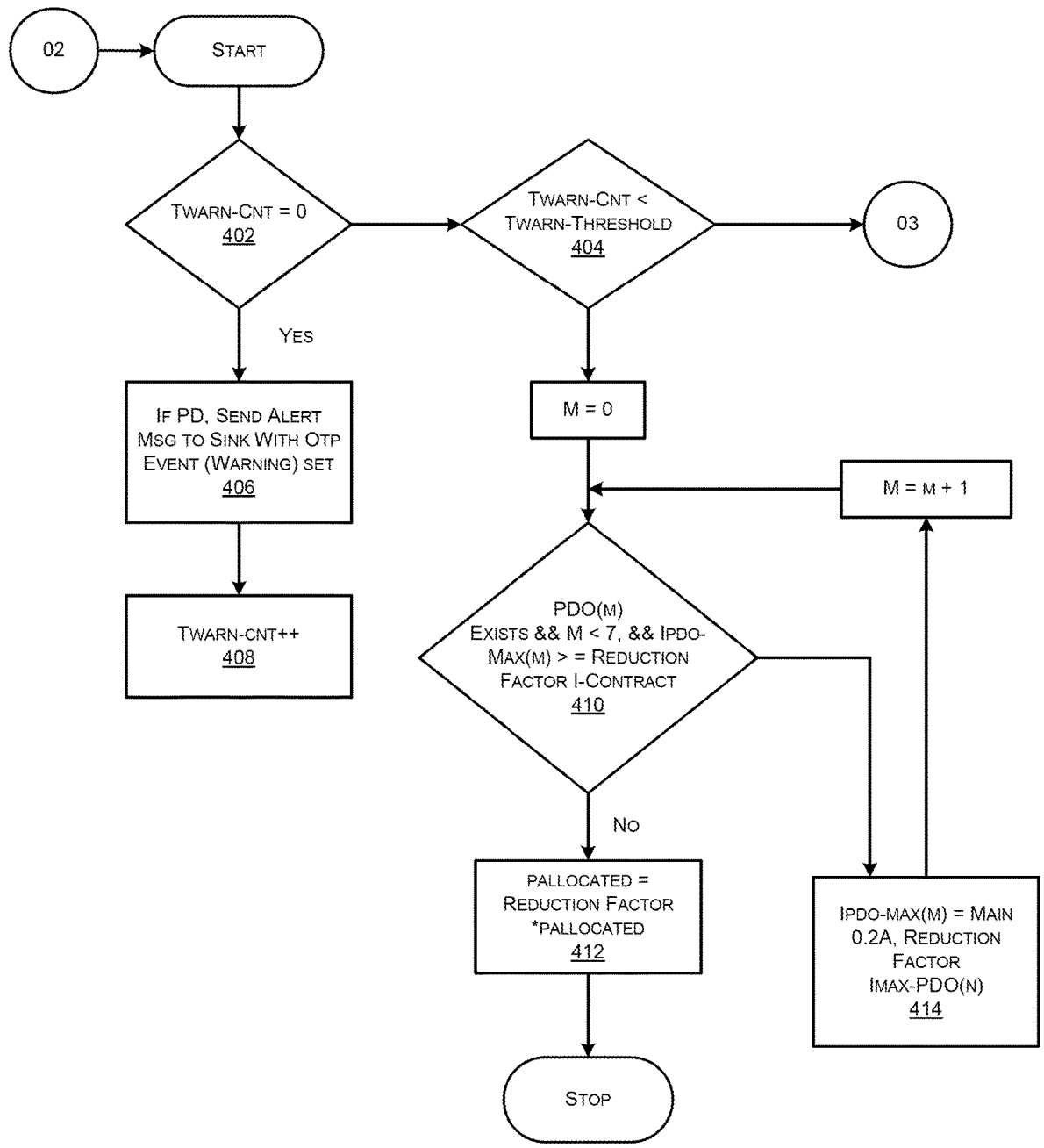
FIG. 4 illustrates an exemplary flow diagram representation of a set of instructions for reduction in power delivery of an overheated port, in accordance with an embodiment of the present disclosure.

In accordance with the above discussed embodiment, FIG. 4 illustrates an exemplary flow diagram representation of a set of instructions for reduction in power delivery of an overheated port, in accordance with an embodiment of the present disclosure. As shown in sub-routine 02, at block 402, if the difference between $T_{WARN}$ and $C_{NT}$ is not zero ($T_{WARN}$–$C_{NT} \neq 0$) (No) then, at block 404, if $T_{WARN}$–$C_{NT}$ is less than $T_{WARN}$–THRESHOLD (Yes) then proceed to process 3. But, if at block 402, the difference between $T_{WARN}$ and $C_{NT}$ is zero ($T_{WARN}$–$C_{NT}=0$), at block 406, if PD is required, send alert message to sink with OTP event (warning) set, then at block 408, increment $T_{WARN\text{-}CNT}$ by 1 ($T_{WARN\text{-}CNT}$++). At block 404, if $T_{WARN}$–$C_{NT}$ is not less than $T_{WARN}$–THRESHOLD (No), M=0, and at block 410, perform PDO(M) and also check for M<7 and IPDO MAX(M)>=reduction factor*I–CONTRACT. If the condition is not satisfied (No), then at block 412, $P_{ALLOCATED}$=reduction factor*$P_{ALLOCATED}$ and then terminate the process. If at block 410, PDO(M) exists and M<7, and IPDO MAX(M) greater than equal to reduction factor*I–CONTRACT condition exists (Yes), then at block 414, IPDO–MAX(M)=MIN(0.2 A, reduction factor IPDO–MAX(N)), and then increment M by 1 (M=M+1).

Figure 5:
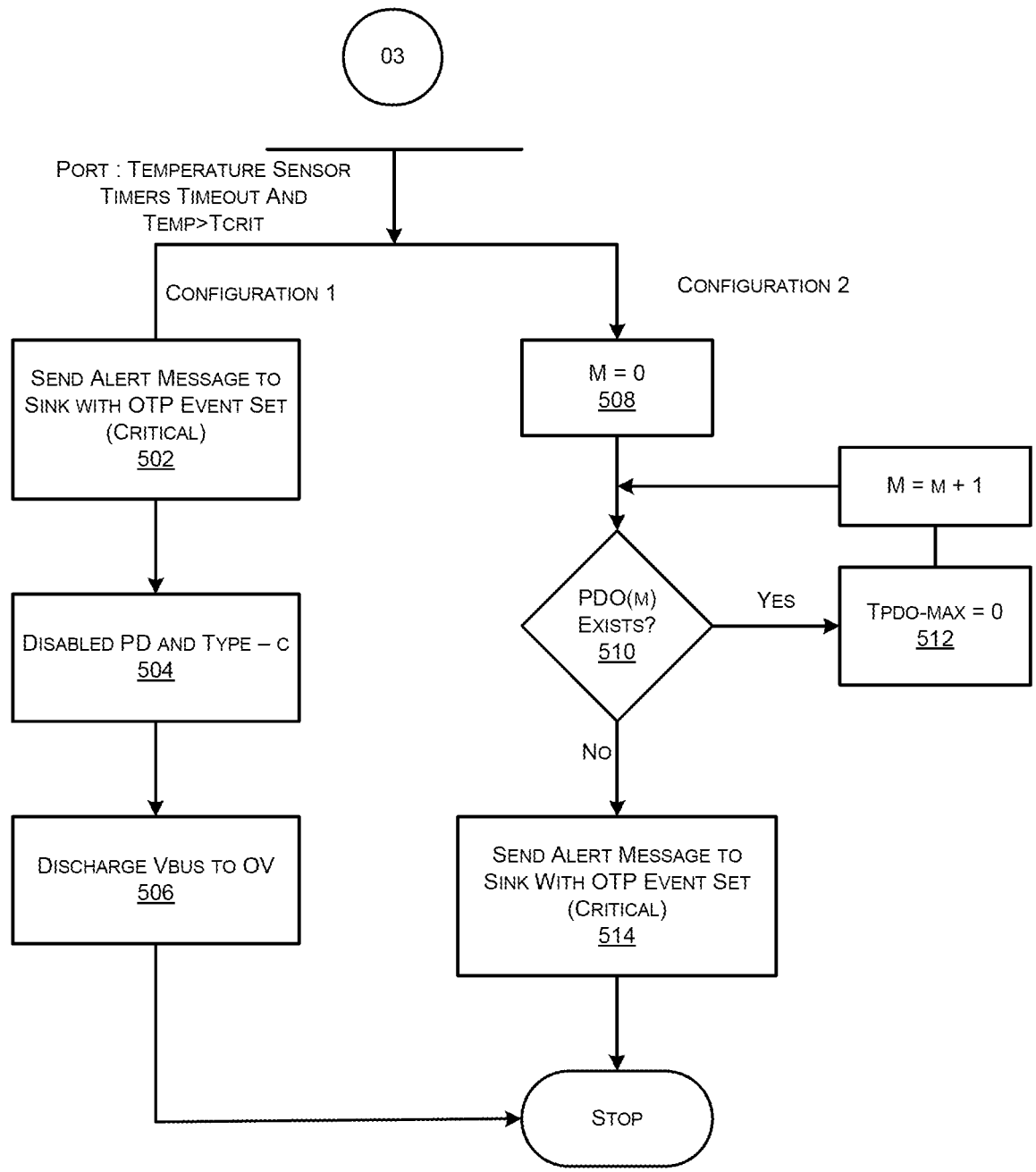
FIG. 5 illustrates an exemplary flow diagram representation for thermal throttling of a plurality of power sourcing devices, in accordance with an embodiment of the present disclosure.

In an embodiment, with reference to FIG. 5 that illustrates an exemplary flow diagram representation for thermal throttling of a plurality of power sourcing devices, in accordance with an embodiment of the present disclosure. In an embodiment, with reference to FIG. 5, in sub-routine 03, upon determining port: temperature sensor timers timeout temperature is greater than critical temperature ($T_{CRIT}$) and configuration 1, at block 502 (Configuration 1), an alert message may be sent to sink with OTP event set as critical, after which at block 504, PD and TYPE-C is disabled and at block 506, discharge VBUS to 0V and terminate the process. Upon determining Configuration 2, at block 508, set M=0, and if at block 510, PDO(M) does not exist (No), then at block 514, an alert message is sent to sink with OTP event is set to critical and then terminate the process. At block 510, if PDO(M) exists, then at block 512, IPDO–MAX=0 and increment M by 1 (M=M+1).

Figure 6:
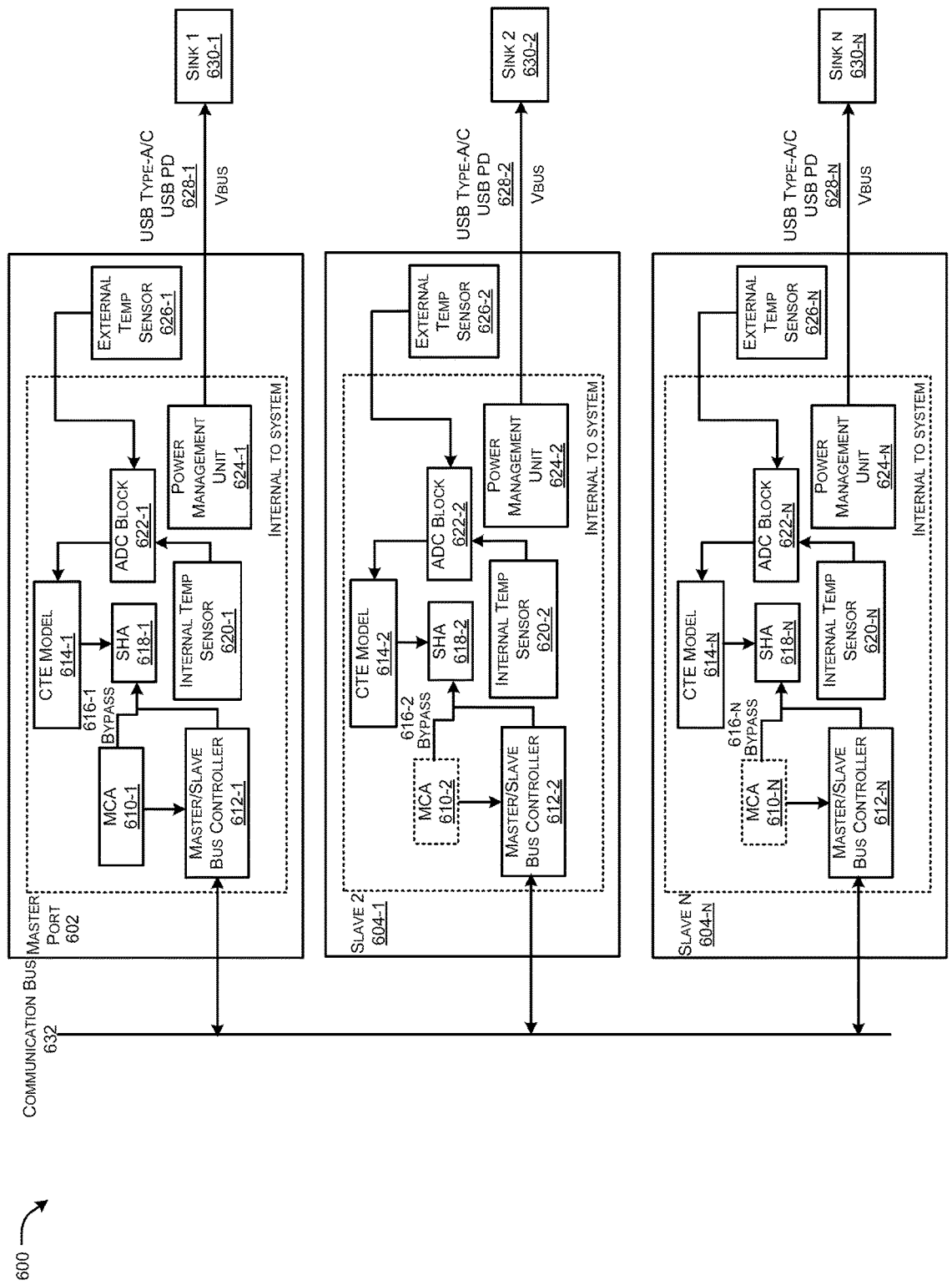
FIG. 6 illustrates an example hardware diagram upon which embodiments described herein may be implemented.

FIG. 6 illustrates an example hardware diagram upon which embodiments described herein may be implemented. As illustrated, the multiport device can include a master port 602, a plurality of slave ports 604-1, 604-2, 604-3 ... 604-n (collectively referred to as slave ports 604 and individually referred to as slave port 604) wherein each slave port 604 can be different from each other in the sense of the power protocol that each slave port 604 follows, a communication bus 632, USB type A, C/USB PD VBus 628 and a plurality of sinks 630-1, 630-2, 630-3 ... 630-n (collectively referred to as sinks 630 and individually referred to as sink 130). The sinks 630 too can be different from each of the plurality of sinks 630 in the sense of different power sinking capacity of each sink 630.

In an embodiment, the master port 602 can include a first set of instructions 610-1 (interchangeably referred to as MCA 610-1) which can be further coupled to Master/Slave Bus Controller 612-1. The Master/Slave Bus controller 612-1 can transfer data to the communication bus 632. In yet another embodiment, the Master port 602 also has SHA (618-1) internal to it. So MCA 610-1 can talk to SHA 618-1 directly using bypass 616-1, 616-2, 616-3 ... 616-N (collectively referred to as bypass 616).

In an embodiment, port temperature sensed on the master port 602 and can be correlated/checked against the current being drawn on this port using a Current-to-Temperature Estimation model (CTE model 614-1) of the device. The CTE model 614-1 may be coupled to the Internal Temperature Sensor 620-1 and External Temperature Sensor 626-1 through an ADC block 622-1.

In an embodiment, a first slave port 604-1 can include a first set of instructions 610-2 (interchangeably referred to as MCA 610-2) which may be inactive. The second set of instructions 618-2 can take control by coupling to Master/Slave Bus Controller 612-2. The Master/Slave Bus controller 612-2 can transfer data to the communication bus 632.

In an embodiment, port temperature sensed on the slave port 604-1 and can be correlated/checked against the current being drawn on this port using a Current-to-Temperature Estimation model (CTE model 614-2) of the device. The CTE model 614-2 may be coupled to the Internal Temperature Sensor 620-2 and External Temperature Sensor 626-2 through an ADC block 622-2.

In an embodiment, there can be a slave port 604-N that can include a first set of instructions 610-n (interchangeably referred to as MCA 610-n) which can remain in an inactive state. Here the second set of instructions 618-N or SHA 618-N can take control by coupling to Master/Slave Bus Controller 612-N. The Master/Slave Bus controller 612-N can transfer data to the communication bus 632.

In an embodiment, port temperature sensed on the slave port 604-N and can be correlated/checked against the current being drawn on this port using a Current-to-Temperature Estimation model (CTE model 614-N) of the device. The CTE model 614-N may be coupled to the Internal Temperature Sensor 620-N and External Temperature Sensor 626-N through an ADC block 622-N.

In an embodiment, each port of the multiport device 600 including master port 602 and each port of the plurality of slave ports 604 can be coupled to a power management unit 624 further coupled to a sink 630 associated with each port via any or USB-Type A, Type-C and VBus 628.

In an embodiment, the execution of SHA 618-1, 618-2, ... 618-N (collectively referred to as SHA 618 and individually as SHA 618) based on the MCA 610-1, 610-2, ... 610-N (collectively referred to as MCA 610 and individually as MCA 610), the request-response communication interface can perform any or a combination of device connection/disconnection detection, dynamic power allotment and redistribution managed by the power management unit 624, but not limited to the like for any or a combination of shared capacity and assured capacity power adapters.

In yet another embodiment, the MCA 610 can maintain record of allocated power across the plurality of ports and inform each of the SHAs 618 about power to be allocated and each of the SHAs can be configured to enable delivery of power over the physical USB port based on a predefined protocol through the power management unit 624 and defined by the MCA 610.

Thus, in an embodiment, the internal temperature sensor (620) and external temperature sensors (626) may sense the temperature each port (602, 604), and the ADC block (622) may convert the sensed temperature into corresponding digital code. The CTE model (614) may correlate current with the sensed temperature to avoid false thermal throttling of the port. The SHA (618) may perform the thermal throttling on detecting a valid warning or critical temperature by reducing the power allocated by a configurable reduction factor or by discharging VBUS (628) completely to 0 depending on the configurations and sensed temperatures. The SHA (618) in each port may further alert the master port (602) about the thermal throttling and power allocation/VBUS discharge details through the communication bus (632).

In another aspect, the present disclosure may include a system to facilitate temperature-aware redistribution of power in a power sourcing device. The system can include the power sourcing device comprises a plurality of ports and plurality of sinks that are connected to the plurality of ports, wherein each of the plurality of ports are associated with an allocated power. The one or more sensors may be temperature sensors that may be placed on a position selected from any or a combination of a position in proximity to the plurality of ports, a position located internally on-die and a position located externally on printed circuit board (PCB) of the power sourcing device. The one or more sensors may be configured to: monitor a first temperature associated with a first port of the plurality of ports, wherein the monitoring may include sensing the first temperature may be associated with the first port and comparing the sensed first temperature with a predefined threshold temperature value to obtain a first set of signals, wherein the first port may be associated with a first allocated power. The power sourcing device may be configured to: execute, based on a second set of signals obtained from the first set of signals, a first set of instructions associated with redistribution of power from the first port to second port of the plurality of ports, wherein the second set of signals may indicate exceeding of the first temperature above the predefined threshold temperature value. The redistribution of power may be done by changing at least one attribute related to power delivery that leads to reduction in the first allocated power of the first port and increase in a second allocated power of the second port having a requirement for allocation of higher power for facilitating temperature-aware redistribution of power in the power sourcing device.

The present disclosure thus provides for a method, device and system for power redistribution between ports in a multi-port power sourcing device based on sensing over-powered ports that may be in turn identified based on temperature sensing of the ports assuming that overpowered ports may be overheated. Once identified, the method and system can enable redistribution of power from overpowered ports to the ports that may need more power thus creating effective power management of ports in a power sourcing device. Further, this may also lead to thermal throttling of over-powered components without need to provide physical cooling components thus generating an effective thermal management of ports and also enabling damage control. Thus, the method and system can accurately monitor and control parameters for temperature-aware power redistribution between ports of a power sourcing devices and so are effective alternatives to conventionally available systems/methods.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The present disclosure provides for a method and system for power redistribution between ports in a multi-port power sourcing device.

The present disclosure provides for a method and system that can sense overpowered ports based on temperature sensing and redistribute power to ports that need more power thus creating effective power management of ports in a power sourcing device.

The present disclosure provides for a method and system to provide a thermal throttling to over-powered components without need to provide physical cooling components thus generating an effective thermal management of ports and also enabling damage control.

The present disclosure provides for a method and system that can accurately monitor and control parameters for temperature-aware power redistribution between ports of a power sourcing devices.

We claim:

1. A method to facilitate temperature-aware redistribution of power in a power sourcing device comprising a plurality of ports, said method comprising:
   monitoring, by using one or more sensors coupled to said power sourcing device, a first temperature associated with a first port of said plurality of ports, wherein the monitoring comprises sensing the first temperature associated with the first port and comparing the sensed first temperature with a predefined threshold temperature value to obtain a first set of signals, wherein said first port is associated with a first allocated power; and
   executing, at the power sourcing device, based on a second set of signals obtained from said first set of signals, a first set of instructions associated with redistribution of power from said first port to a second port of the plurality of ports, wherein the second set of signals indicate exceeding of the first temperature above the predefined threshold temperature value,
   wherein the redistribution of power is done by changing at least one attribute related to power delivery that leads to reduction in said first allocated power of the first port and increase in a second allocated power of the second port, for facilitating temperature-aware redistribution of power in the power sourcing device;
   wherein, when a close proximity of the port temperature to the predefined threshold temperature is sensed, the first temperature is correlated against the current being drawn on this port using a Current-to-Temperature Estimation model (CTE model) of the device, wherein the CTE model takes the current being drawn and the temperature sensed as input,
   wherein upon indication of a negative correlation between the temperature rise against the current being drawn on the first port, current drawn over the remaining ports of the plurality of ports is correlated against the rise in the port temperature,
   wherein upon indication of the positive correlation with any of the remaining ports of the plurality of ports, the power on the first port is not thermally throttled and power delivery to the first port is not reduced, and
   wherein if no port establishes a positive correlation, the plurality of ports is thermally throttled in a balanced manner.

2. The method as claimed in claim 1, wherein said power sourcing device is a multi-port power sourcing device, each of the plurality of ports is selected from one or more of a Universal Serial Bus (USB) Type-C port and a USB Type-A port, each port is associated with an allocated power, wherein said one or more sensors are temperature sensors placed on a position selected from one or more of: a position in proximity to the plurality of ports, a position located internally on-die, or a position located externally on printed circuit board (PCB) of the power sourcing device, wherein monitoring the first port is done continuously or intermittently at a plurality of time intervals, and
   wherein the generation of the second set of signals is based on temperature of the first port and other factors comprising one or more of: temperature of remaining ports of the plurality of ports, a position of the one or more sensors with respect to the power sourcing device, a temperature of the sink, or a temperature of cable connected to the first port and used for power delivery.

3. The method as claimed in claim 1, wherein the second port comprises a requirement for allocation of higher power, wherein said second port of the plurality of ports is a thermally stable port and the second allocated power is relatively lesser than the power required by the sink connected, wherein the redistribution of power leads to thermal throttling of the first port and reduction of the first temperature below the predefined threshold temperature value, and wherein the predefined threshold temperature value includes any one limit selected from a warning threshold temperature value and a critical threshold temperature value, wherein the critical threshold temperature value is relatively higher than the warning threshold temperature value.

4. The method as claimed in claim 1, wherein said at least one attribute comprises current flowing from each port to a port partner, and wherein the regulation of the at least one attribute is done in a stepwise manner, and wherein said redistribution of power includes reducing current limit from said first port and increasing the power allocated to at least one port of plurality of ports by increasing the current limit from the plurality of ports.

5. The method as claimed in claim 1, wherein the power sourcing device supports USB power delivery (USB-PD), wherein said redistribution of power is achieved by communication between the plurality of ports and the sinks connected by a request-response communication in form of data packets, wherein upon detection of the second set of signals, the current limit corresponding to the first allocated power and the second allocated power are updated and communicated by said request-response communication, wherein the first allocated power is associated with the first port and the second allocated power is associated with the second port.

6. The method as claimed in claim 5, wherein the reduction in the current limit is obtained by sending, from said port to the sink, a first set of data packets including updated information associated with current capabilities for renegotiation, wherein the update in the current capabilities includes reduction in the current limit by a predetermined percentage, and
wherein upon detection of the second set of signals wherein the first temperature exceeds the critical threshold temperature value, the current limit corresponding to 0 A is advertised in all the source capabilities included in the first set of data packets.

7. The method as claimed in claim 6, wherein upon detection of the second set of signals wherein the first temperature exceeds the critical threshold temperature value, the first port is shut down and the sink is latched off from VBUS power to reduce the temperature with a rapid rate.

8. The method as claimed in claim 6, wherein before sending the first set of data packets, the method comprises sending, from said USB Type-C port to said sink, a second set of data packets including an alert message with Over-temperature protection (OTP) bit information set as 1, to inform detection of over-heating caused by exceeding of the port temperature over any of the warning threshold temperature value or the critical threshold temperature value,
wherein after the alert message is sent to the sink, a configurable time duration is given to the sink for reducing power requirement by sending, from said sink to said port, a third set of data packets including an updated request message with information about the reduced operating current requirement, and
wherein upon receipt of the updated request message, the request is accepted by sending an accept message in form of fourth set of data packets.

9. A system to facilitate temperature-aware redistribution of power in a power sourcing device, said system comprising:
the power sourcing device comprising a plurality of ports and a plurality of sinks that are connected to said plurality of ports, wherein each of the plurality of ports is associated with an allocated power; and
one or more sensors coupled to the power sourcing device, wherein said one or more sensors are temperature sensors placed on a position selected from any or a combination of a position in proximity to the plurality of ports, a position located internally on-die and a position located externally on printed circuit board (PCB) of the power sourcing device,
wherein said one or more sensors are temperature sensors are configured to:
monitor a first temperature associated with a first port of said plurality of ports, wherein the monitoring comprises sensing the first temperature associated with the first port and comparing the sensed first temperature with a predefined threshold temperature value to obtain a first set of signals, wherein said first port is associated with a first allocated power;
wherein the power sourcing device is configured to:
execute, based on a second set of signals obtained from said first set of signals, a first set of instructions associated with redistribution of power from said first port to a second port of the plurality of ports, wherein the second set of signals indicate exceeding of the first temperature above the predefined threshold temperature value, and
wherein the redistribution of power is done by changing at least one attribute related to power delivery that leads to reduction in said first allocated power of the first port and increase in a second allocated power of the second port of the plurality of ports for facilitating temperature-aware redistribution of power in the power sourcing device;
wherein, when a close proximity of the port temperature to the predefined threshold temperature is sensed, the first temperature is correlated against the current being drawn on this port using a Current-to-Temperature Estimation model (CTE model) of the power sourcing device, wherein the CTE model takes the current being drawn and the temperature sensed as input,
wherein upon indication of a negative correlation between the temperature rise against the current being drawn on the first port, current drawn over the remaining ports of the plurality of ports is correlated against the rise in the port temperature,
wherein upon indication of the positive correlation with any of the remaining ports of the plurality of ports, the power on the first port is not thermally throttled and power delivery to the first port is not reduced, and
wherein if no port establishes a positive correlation, the plurality of ports is thermally throttled in a balanced manner.

10. The method of claim 1, wherein the predefined threshold temperature value comprises a hysterisis range having a first hysterisis threshold and a second hysterisis threshold for which a warning condition is set, the warning condition being met when the first temperature rises above the first hysterisis threshold, and the warning condition being cleared when the first temperature falls below a second hysterisis threshold.

11. The method of claim 10, wherein the first hysterisis threshold is greater than the second hysterisis threshold.

12. The system of claim 9, wherein the predefined threshold temperature value comprises a hysterisis range having a first hysterisis threshold and a second hysterisis threshold for which a warning condition is set, the warning condition being met when the first temperature rises above the first hysterisis threshold, and the warning condition being cleared when the first temperature falls below a second hysterisis threshold.

13. The system of claim 12, wherein the first hysterisis threshold is greater than the second hysterisis threshold.

14. A method to facilitate temperature-aware redistribution of power in a power sourcing device comprising a plurality of ports, said method comprising:
monitoring, by using one or more sensors coupled to said power sourcing device, a first temperature associated with a first port of said plurality of ports, wherein the monitoring comprises sensing the first temperature associated with the first port and comparing the sensed first temperature with a predefined threshold temperature value to obtain a first set of signals, wherein said first port is associated with a first allocated power; and
executing, at the power sourcing device, based on a second set of signals obtained from said first set of signals, a first set of instructions associated with redistribution of power from said first port to a second port of the plurality of ports, wherein the second set of signals indicate exceeding of the first temperature above the predefined threshold temperature value,
wherein the redistribution of power is done by changing at least one attribute related to power delivery that leads to reduction in said first allocated power of the first port and increase in a second allocated power of the second port, for facilitating temperature-aware redistribution of power in the power sourcing device;
wherein the power sourcing device supports USB power delivery (USB-PD), wherein said redistribution of power is achieved by communication between the plurality of ports and the sinks connected by a request-response communication in form of data packets, wherein upon detection of the second set of signals, the current limit corresponding to the first allocated power and the second allocated power are updated and communicated by said request-response communication, wherein the first allocated power is associated with the first port and the second allocated power is associated with the second port;
wherein the reduction in the current limit is obtained by sending, from said port to the sink, a first set of data packets including updated information associated with current capabilities for renegotiation, wherein the update in the current capabilities includes reduction in the current limit by a predetermined percentage, and
wherein upon detection of the second set of signals wherein the first temperature exceeds the critical threshold temperature value, the current limit corresponding to 0 A is advertised in all the source capabilities included in the first set of data packets.

15. The method as claimed in claim 14, wherein said power sourcing device is a multi-port power sourcing device, each of the plurality of ports is selected from one or more of a Universal Serial Bus (USB) Type-C port and a USB Type-A port, each port is associated with an allocated power, wherein said one or more sensors are temperature sensors placed on a position selected from one or more of: a position in proximity to the plurality of ports, a position located internally on-die, or a position located externally on printed circuit board (PCB) of the power sourcing device, wherein monitoring the first port is done continuously or intermittently at a plurality of time intervals, and
wherein the generation of the second set of signals is based on temperature of the first port and other factors comprising one or more of: temperature of remaining ports of the plurality of ports, a position of the one or more sensors with respect to the power sourcing device, a temperature of the sink, or a temperature of cable connected to the first port and used for power delivery.

16. The method as claimed in claim 14, wherein the second port comprises a requirement for allocation of higher power, wherein said second port of the plurality of ports is a thermally stable port and the second allocated power is relatively lesser than the power required by the sink connected, wherein the redistribution of power leads to thermal throttling of the first port and reduction of the first temperature below the predefined threshold temperature value, and wherein the predefined threshold temperature value includes any one limit selected from a warning threshold temperature value and a critical threshold temperature value, wherein the critical threshold temperature value is relatively higher than the warning threshold temperature value.

17. The method as claimed in claim 14, wherein said at least one attribute comprises current flowing from each port to a port partner, and wherein the regulation of the at least one attribute is done in a stepwise manner, and wherein said redistribution of power includes reducing current limit from said first port and increasing the power allocated to at least one port of plurality of ports by increasing the current limit from the plurality of ports.

18. The method as claimed in claim 14, wherein upon detection of the second set of signals wherein the first temperature exceeds the critical threshold temperature value, the first port is shut down and the sink is latched off from VBUS power to reduce the temperature with a rapid rate.

19. The method as claimed in claim 14, wherein before sending the first set of data packets, the method comprises sending, from said USB Type-C port to said sink, a second set of data packets including an alert message with Over-temperature protection (OTP) bit information set as 1, to inform detection of over-heating caused by exceeding of the port temperature over any of the warning threshold temperature value or the critical threshold temperature value,
wherein after the alert message is sent to the sink, a configurable time duration is given to the sink for reducing power requirement by sending, from said sink to said port, a third set of data packets including an updated request message with information about the reduced operating current requirement, and
wherein upon receipt of the updated request message, the request is accepted by sending an accept message in form of fourth set of data packets.

20. The method of claim 14, wherein the predefined threshold temperature value comprises a hysterisis range having a first hysterisis threshold and a second hysterisis threshold for which a warning condition is set, the warning condition being met when the first temperature rises above the first hysterisis threshold, and the warning condition being cleared when the first temperature falls below a second hysterisis threshold.

21. The method of claim 20, wherein the first hysterisis threshold is greater than the second hysterisis threshold.

22. A system to facilitate temperature-aware redistribution of power in a power sourcing device, said system comprising:
the power sourcing device comprising a plurality of ports and a plurality of sinks that are connected to said plurality of ports, wherein each of the plurality of ports is associated with an allocated power; and
one or more sensors coupled to the power sourcing device, wherein said one or more sensors are temperature sensors placed on a position selected from any or a combination of a position in proximity to the plurality of ports, a position located internally on-die and a position located externally on printed circuit board (PCB) of the power sourcing device,
wherein said one or more sensors are temperature sensors are configured to:
monitor a first temperature associated with a first port of said plurality of ports, wherein the monitoring comprises sensing the first temperature associated with the first port and comparing the sensed first temperature with a predefined threshold temperature value to obtain a first set of signals, wherein said first port is associated with a first allocated power;
wherein the power sourcing device is configured to:
execute, based on a second set of signals obtained from said first set of signals, a first set of instructions associated with redistribution of power from said first port to a second port of the plurality of ports, wherein the second set of signals indicate exceeding of the first temperature above the predefined threshold temperature value, and
wherein the redistribution of power is done by changing at least one attribute related to power delivery that leads to reduction in said first allocated power of the first port and increase in a second allocated power of the second port of the plurality of ports for facilitating temperature-aware redistribution of power in the power sourcing device;
wherein the power sourcing device supports USB power delivery (USB-PD), wherein said redistribution of power is achieved by communication between the plurality of ports and the sinks connected by a request-response communication in form of data packets, wherein upon detection of the second set of signals, the current limit corresponding to the first allocated power and the second allocated power are updated and communicated by said request-response communication, wherein the first allocated power is associated with the first port and the second allocated power is associated with the second port;
wherein the reduction in the current limit is obtained by sending, from said port to the sink, a first set of data packets including updated information associated with current capabilities for renegotiation, wherein the update in the current capabilities includes reduction in the current limit by a predetermined percentage, and
wherein upon detection of the second set of signals wherein the first temperature exceeds the critical threshold temperature value, the current limit corresponding to 0 A is advertised in all the source capabilities included in the first set of data packets.

* * * * *